(12) United States Patent
Cho et al.

(10) Patent No.: US 9,466,856 B2
(45) Date of Patent: Oct. 11, 2016

(54) NON-AQUEOUS ELECTROLYTE AND ELECTROCHEMICAL DEVICE COMPRISING THE SAME

(71) Applicant: LG Chem, Ltd., Seoul (KR)

(72) Inventors: Jeong-Ju Cho, Daejeon (KR); Ho-Chun Lee, Daejeon (KR); Su-Jin Yoon, Gyeonggi-do (KR); Soo-Min Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/520,701

(22) Filed: Oct. 22, 2014

(65) Prior Publication Data

US 2015/0140447 A1 May 21, 2015

Related U.S. Application Data

(63) Continuation of application No. 12/447,042, filed as application No. PCT/KR2007/005125 on Oct. 19, 2007, now Pat. No. 8,895,195.

(30) Foreign Application Priority Data

Oct. 25, 2006 (KR) .................. 10-2006-0103934

(51) Int. Cl.
| | | |
|---|---|---|
| H01M 10/0567 | (2010.01) | |
| H01M 10/0568 | (2010.01) | |
| H01M 10/0569 | (2010.01) | |
| H01M 10/052 | (2010.01) | |
| H01M 10/42 | (2006.01) | |

(52) U.S. Cl.
CPC ....... *H01M 10/0567* (2013.01); *H01M 10/052* (2013.01); *H01M 10/0568* (2013.01); *H01M 10/0569* (2013.01); *H01M 10/4235* (2013.01); *H01M 2220/20* (2013.01); *H01M 2220/30* (2013.01); *H01M 2300/0025* (2013.01); *Y02E 60/122* (2013.01); *Y02T 10/7011* (2013.01)

(58) Field of Classification Search
CPC .......... H01M 10/0567; H01M 10/0569; H01M 10/0568; H01M 10/4235; H01M 10/052; H01M 2220/20; H01M 2220/30; Y01T 10/7011; Y02E 60/122
See application file for complete search history.

(56) References Cited

U.S. PATENT DOCUMENTS

| | | |
|---|---|---|
| 6,280,882 B1 | 8/2001 | Vallee et al. |
| 6,436,583 B1 | 8/2002 | Mikhaylik |
| 6,613,475 B2 | 9/2003 | Fauteux et al. |
| 6,709,787 B2 | 3/2004 | Zhao et al. |
| 6,939,644 B2 | 9/2005 | Aoshima et al. |
| 7,425,388 B2 | 9/2008 | Park et al. |
| 2003/0104282 A1 | 6/2003 | Xing et al. |
| 2003/0190529 A1 | 10/2003 | Kim et al. |
| 2004/0048163 A1 | 3/2004 | Park et al. |
| 2004/0110068 A1 | 6/2004 | Seki et al. |
| 2004/0139587 A1 | 7/2004 | Sato et al. |
| 2004/0146786 A1 | 7/2004 | Sato et al. |
| 2005/0130035 A1 | 6/2005 | Inada et al. |
| 2006/0115739 A1* | 6/2006 | Yamaguchi ............ H01M 4/38 429/326 |
| 2007/0212613 A1 | 9/2007 | Ishida et al. |
| 2007/0224504 A1 | 9/2007 | Kita et al. |

FOREIGN PATENT DOCUMENTS

| | | |
|---|---|---|
| CN | 1278953 A | 1/2001 |
| CN | 1495961 A | 5/2004 |
| CN | 1599120 A | 3/2005 |
| JP | 2002158034 | 5/2002 |
| JP | 2002208437 A | 7/2002 |
| JP | 2002324577 A | 11/2002 |
| JP | 2003-086249 A | 3/2003 |
| JP | 2003168479 | 6/2003 |
| JP | 2003297426 A | 10/2003 |
| JP | 2004103573 A | 4/2004 |
| JP | 2004179146 A | 6/2004 |
| JP | 2005285563 A | 10/2005 |
| KR | 20010074419 | 8/2001 |
| KR | 20010082428 | 8/2001 |
| KR | 1020020023485 A | 3/2002 |
| KR | 20020079346 | 10/2002 |
| KR | 20050041093 | 5/2005 |
| WO | 2005117197 | 12/2005 |

OTHER PUBLICATIONS

Itagaki et al. [Itagaki] (Journal of Power Sources vol. 148 pp. 78-84, Online Feb. 1, 2005).*
Of Kim et al. [Kim] (Journal of Power Sources, vol. 146, 2005, pp. 584-588 Online—Jun. 2, 2005).*
International Search Report, PCT/KR2007/005125, dated Dec. 20, 2007.
MSDS 1,3-propane sultone, Oxford UK 2005 {http://physchem.ox.ac.uk/msds/PR/1,3-propane_sultone.html}.

* cited by examiner

*Primary Examiner* — Patrick Ryan
*Assistant Examiner* — Aaron Greso
(74) *Attorney, Agent, or Firm* — Lerner, David, Littenberg, Krumholz & Mentlik, LLP

(57) ABSTRACT

Disclosed is a non-aqueous electrolyte comprising: an acrylate compound; a sulfinyl group-containing compound; an organic solvent; and an electrolyte salt. Also, disclosed is an electrode comprising a coating layer formed partially or totally on a surface thereof, the coating layer comprising: (i) a reduced form of an acrylate compound; and (ii) a reduced form of a sulfinyl group-containing compound. Further, disclosed is an electrochemical device comprising a cathode, an anode and a non-aqueous electrolyte, wherein (i) the non-aqueous electrolyte is the aforementioned non-aqueous electrolyte; and/or (ii) the cathode and/or the anode is the aforementioned electrode.

7 Claims, No Drawings

NON-AQUEOUS ELECTROLYTE AND ELECTROCHEMICAL DEVICE COMPRISING THE SAME

The present application is a continuation, of U.S. patent application Ser. No. 12/447,042, filed Mar. 29, 2011, which application is a national phase entry under 35 U.S.C. §371 of International Application No. PCT/KR2007/005125, filed Oct. 19, 2007, published in English, which claims the benefit of Korean Patent Application No. 10-2006-0103934, filed Oct. 25, 2006. The disclosures of said applications are incorporated by reference herein.

TECHNICAL FIELD

The present invention relates to a non-aqueous electrolyte, an electrode and an electrochemical device comprising the same. More particularly, the present invention relates to a non-aqueous electrolyte comprising compounds capable of improving the lifespan and thermal stability of an electrochemical device, and an electrochemical device comprising the same. Also, the present invention relates to an electrode comprising reduced forms of compounds capable of improving the lifespan and thermal stability of an electrochemical device, and an electrochemical device comprising the same.

BACKGROUND ART

Recently, there has been increasing interest in energy storage technology. As batteries have been widely used as energy sources in portable phones, camcorders, notebook computers, PCs and electric cars, research and development of electrochemical devices have been made intensively. In this regard, electrochemical devices are subjects of great interest. Particularly, development of rechargeable secondary batteries has been the focus of attention. More recently, research and development of an electrode and a battery having a novel design have been conducted in order to improve capacity density and specific energy thereof.

Among the currently used secondary batteries, lithium secondary batteries, developed in early 1990's, have drive voltage and energy density higher than those of conventional batteries using aqueous electrolytes (such as Ni-MH batteries, Ni—Cd batteries and $H_2SO_4$—Pb batteries), and thus are spotlighted in the field of secondary batteries. However, a lithium secondary battery has a problem in that it undergoes degradation of quality during repeated charge/discharge cycles. Such problems become more serious as the capacity density of the battery increases.

Therefore, there is a continuous need to develop a means for improving lifespan of a secondary battery.

Japanese Laid-Open Patent No. 2002-158034 discloses an acrylic compound as an additive for an electrolyte, the acrylic compound being able to inhibit gas generation in a lithium secondary battery and deterioration of an anode. Additionally, Japanese Laid-Open Patent No. 2003-168479 discloses that the use of an acrylic compound having at least three acryl groups as an additive for an electrolyte in a lithium secondary battery leads to formation of a solid electrolyte interface (SEI) layer via reduction at an anode, and such SEI layers inhibit decomposition of the electrolyte at the anode so as to improve lifespan characteristics of the battery.

DISCLOSURE

Technical Problem

Therefore, the present invention has been made in view of the above-mentioned problems. In general, when an acrylate compound having a polymerizable double bond is used as an additive for an electrolyte in an electrochemical device, such as a lithium secondary battery, it is reduced at the anode of the battery in advance of the main solvent, such as ethylene carbonate, to form a solid electrolyte interface (SEI) layer with excellent quality. In this regard, the inventors of the present invention have found that when a sulfinyl group-containing compound is used in combination with the acrylate compound, the aforementioned effect provided by the acrylate compound can be maximized.

Therefore, it is an object of the present invention to provide a non-aqueous electrolyte that comprises an acrylate compound in combination with a sulfinyl group-containing compound, and an electrochemical device comprising the above non-aqueous electrolyte.

Technical Solution

In order to achieve the above-mentioned object, there is provided a non-aqueous electrolyte comprising: an acrylate compound; a sulfinyl group-containing compound; an organic solvent; and an electrolyte salt. Also, there is provided an electrode comprising a coating layer formed partially or totally on a surface thereof, the coating layer comprising: (i) a reduced form of an acrylate compound; and (ii) a reduced form of a sulfinyl group-containing compound.

Further, there is provided an electrochemical device comprising a cathode, an anode and a non-aqueous electrolyte, wherein (i) the non-aqueous electrolyte is the aforementioned non-aqueous electrolyte according to the present invention; and/or (ii) the cathode and/or the anode is the aforementioned electrode according to the present invention.

MODE FOR INVENTION

The non-aqueous electrolyte according to the present invention is characterized by comprising an acrylate compound in combination with a sulfinyl group-containing compound. It is known that when an acrylate compound having a polymerizable double bond is used as an additive for an electrolyte in an electrochemical device, the acrylate compound is reduced at the anode in advance of a carbonate solvent used as the main solvent to form a solid electrolyte interface (SEI) layer with excellent quality. The effect provided by the acrylate compound can be maximized when a sulfinyl group-containing compound is used in combination with the acrylate compound.

When the acrylate compound is reduced, it forms a relatively thick and dense SEI layer, while the sulfinyl group-containing compound forms a relatively thin and porous SEI layer. Due to such different densities, when the above compounds are used in combination as additives for an electrolyte according to the present invention, a first SEI layer is formed by one component, and then a second SEI layer may be formed by the other component on a thinner or porous portion of the first SEI layer or on a portion of the anode surface having no SEI layer. As a result, a firm SEI layer can be formed on the anode surface. Therefore, it is possible to improve the quality of an electrochemical device by using the non-aqueous electrolyte comprising the acrylate compound in combination with the sulfinyl group-containing compound for manufacturing the electrochemical device.

In the non-aqueous electrolyte according to the present invention, the acrylate compound includes a compound having one or more acryl groups in its molecule. Non-limiting examples of such acrylate compounds include, but are not limited to: tetraethyleneglycol diacrylate, polyethyleneglycol diacrylate (molecular weight 50~20,000), bisphenol A ethoxylated diacrylate (molecular weight 100~10,000), 1,4-butanediol diacrylate, 1,6-hexanediol diacrylate, trimethylolpropane triacrylate, trimethylolpropane ethyoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, tris[2-(acryloyloxy)ethyl]isocyanurate, or the like. The above acrylate compounds may be used alone or in combination.

The acrylate compound is used in an amount of 0.05~10 wt % in the non-aqueous electrolyte. When the acrylate compound is used in an amount less than 0.05 wt %, it is not possible to improve the lifespan of an electrochemical device sufficiently despite the use of the acrylate compound. When the acrylate compound is used in an amount greater than 10 wt %, irreversible capacity increases, resulting in degradation of the quality of the electrochemical device using the same compound.

In the non-aqueous electrolyte according to the present invention, non-limiting examples of the sulfinyl group-containing compound include sulfites, sulfonates and sultones, and the above compounds may be used alone or in combination.

The sulfite compound may be represented by the following Formula 1:

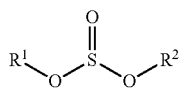

[Formula 1]

wherein each of $R^1$ and $R^2$ independently represents a hydrogen atom, halogen atom, C1~C6 alkyl group, C6~C12 aryl group, C2~C6 alkenyl group or a halogen derivative thereof, and $R_1$ and $R_2$ may be bound to each other.

Particular examples of the sulfite include, but are not limited to: ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like. The above sulfite compounds may be used alone or in combination.

The sulfonate compound may be represented by the following Formula 2:

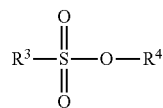

[Formula 2]

wherein each of $R^3$ and $R^4$ independently represents a hydrogen atom, halogen atom, C1~C6 alkyl group, C6~C12 aryl group, C2~C6 alkenyl group or a halogen derivative thereof.

Particular examples of the sulfonate include, but are not limited to: methyl methanesulfonate, ethyl methanesulfonate, methyl ethanesulfonate, propyl methanesulfonate, methyl propanesulfonate, ethyl propanesulfonate, ethenyl methanesulfonate, propenyl methanesulfonate, ethenyl benzenesulfonate, propenyl propenesulfonate, propenyl cyanoethanesulfonate, or the like. The above sulfonate compounds may be used alone or in combination.

The sultone compound may be represented by the following Formula 3 and/or Formula 4:

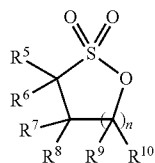

[Formula 3]

wherein each of $R^5$~$R^{10}$ independently represents a hydrogen atom, halogen atom, C1~C6 alkyl group, C6~C12 aryl group, C2~C6 alkenyl group or a halogen derivative thereof; and n is an integer of 1~3.

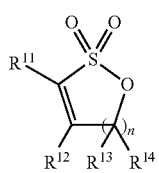

[Formula 4]

wherein each of $R^{11}$~$R^{14}$ independently represents a hydrogen atom, halogen atom, C1~C6 alkyl group, C6~C12 aryl group, C2~C6 alkenyl group or a halogen derivative thereof; and n is an integer of 1~3.

Particular examples of the sultone represented by Formulae 3 and 4 include, but are not limited to: 1,3-propane sultone, 1,4-butane sultone, 1,3-propene sultone, 1,4-butene sultone, 1-methyl-1,3-propene sultone and derivatives thereof. The above sultone compounds may be used alone or in combination.

The sulfinyl group-containing compound is used preferably in an amount of 0.1~5 wt % in the non-aqueous electrolyte. When the sulfinyl group-containing compound is used in an amount less than 0.1 wt %, it is not possible to improve the lifespan of an electrochemical device sufficiently. When the sulfinyl group-containing compound is used in an amount greater than 5 wt %, it causes undesired gas generation and an increase in the impedance.

The non-aqueous electrolyte comprises an organic solvent. There is no particular limitation in the organic solvent, as long as the solvent is one currently used for a non-aqueous electrolyte. Particular examples of the solvent include cyclic carbonates, linear carbonates, lactones, ethers, esters, acetonitriles, lactams and/or ketones. Halogen derivatives of such solvents may also be used.

Particular examples of the cyclic carbonates include ethylene carbonate (EC), propylene carbonate (PC), butylene carbonate (BC), fluoroethylene carbonate (FEC), or the like. Particular examples of the linear carbonates include diethyl carbonate (DEC), dimethyl carbonate (DMC), dipropyl carbonate (DPC), ethyl methyl carbonate (EMC), methyl propyl carbonate (MPC), or the like. Particular examples of the lactones include gamma-butyrolactone (GBL) and those of ethers include dibutyl ether, tetrahydrofuran, 2-methyltetrahydrofuran, 1,4-dioxane, 1,2-dimethoxyethane, 1,2-diethoxyethane, or the like. Particular examples of the esters include methyl formate, ethyl formate, propyl formate, methyl acetate, ethyl acetate, propyl acetate, methyl propionate, ethyl propionate, butyl propionate, methyl pivalate, or the like. Additionally, particular examples of the lactams include N-methyl pyrrolidone (NMP), or the like. Further, particular examples of the ketones include polymethylvinyl ketone. Halogen derivatives of the above organic solvents may also be used. Such organic solvents may be used alone or in combination.

The non-aqueous electrolyte according to the present invention further comprises an electrolyte salt. There is no particular limitation in the electrolyte salt, as long as the electrolyte salt is one currently used for a non-aqueous electrolyte.

Non-limiting examples of the electrolyte salt include salts formed by a combination of: (i) a cation selected from the group consisting of $Li^+$, $Na^+$ and $K^+$; with (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$. Such electrolyte salts may be used alone or in combination. Particularly, a lithium salt is preferred.

In another aspect of the present invention, the electrode according to the present invention comprises a coating layer, such as a solid electrolyte interface (SEI) layer, formed partially or totally on a surface of the electrode, the coating layer comprising: (i) a reduced form of an acrylate compound; and (ii) a reduced form of a sulfinyl group-containing compound.

The coating layer, such as the SEI layer, may be formed upon the first charge or during the subsequent charge/discharge cycles of the electrochemical device using the electrode. The electrode according to the present invention may be obtained by reducing an electrode manufactured according to a method generally known to those skilled in the art, at least once, in the non-aqueous electrolyte comprising the acrylate compound and the sulfinyl group-containing compound. In a variant, the electrode according to the present invention may be obtained by inserting a porous separator between a cathode and an anode, manufactured according to a method generally known to those skilled in the art, introducing the non-aqueous electrolyte comprising the acrylate compound and the sulfinyl group-containing compound thereto, and by subjecting the resultant cell to at least one charge cycle.

In the electrode according to the present invention, the reduced form of the acrylate compound and the reduced form of the sulfinyl group-containing compound may be produced via the reductive decomposition of the acrylate compound and the sulfinyl group-containing compound, respectively. Additionally, in the electrode according to the present invention, non-limiting examples of the acrylate compound and the sulfinyl group-containing compound are the same as those of the acrylate compound and the sulfinyl group-containing compound used in the non-aqueous electrolyte according to the present invention.

In still another aspect of the present invention, the electrochemical device according to the present invention comprises a cathode, an anode and a non-aqueous electrolyte, wherein the non-aqueous electrolyte is the aforementioned non-aqueous electrolyte according to the present invention.

In a variant, the electrochemical device according to the present invention comprises a cathode, an anode and a non-aqueous electrolyte, wherein the cathode and/or the anode are/is the aforementioned electrode according to the present invention. Herein, the non-aqueous electrolyte may be the aforementioned non-aqueous electrolyte according to the present invention.

The electrochemical device according to the present invention includes all types of devices in which electrochemical reactions are performed. Particular examples of the electrochemical device include all types of primary batteries, secondary batteries, fuel cells, solar cells, capacitors, or the like. Among the secondary batteries, lithium secondary batteries, including lithium metal secondary batteries, lithium ion secondary batteries, lithium polymer secondary batteries or lithium ion polymer secondary batteries, are preferred.

The electrochemical device may be obtained by using a conventional method known to those skilled in the art. For example, a porous separator is inserted between a cathode and an anode to form an electrode assembly, and then the non-aqueous electrolyte according to the present invention is injected thereto.

The electrode used in the electrochemical device according to the present invention may be manufactured by a conventional method known to one skilled in the art. For example, an electrode active material may be mixed with a solvent, and optionally with a binder, a conductive agent and a dispersant, and the mixture is agitated to provide slurry. Then, the slurry is applied onto a metal collector, and the collector coated with the slurry is compressed and dried to provide an electrode.

The electrode active material includes a cathode active material or an anode active material.

Cathode active materials that may be used in the present invention include: lithium transition metal composite oxides, such as $LiM_xO_y$, (M=Co, Ni, Mn, $Co_aNi_bMn_c$) (e.g. lithium manganese composite oxides such as $LiMn_2O_4$, lithium nickel oxides such as $LiNiO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc.

Anode active materials that may be used in the present invention include those currently used in anodes for electrochemical devices. Particular examples of the anode active materials include lithium metal, lithium alloys, carbon, petroleum coke, activated carbon, graphite or carbon fiber capable of lithium ion intercalation/deintercalation. Other metal oxides capable of lithium intercalation/deintercalation and having a potential vs. $Li^+/Li$ of less than 2V (for example, $TiO_2$ or $SnO_2$) may also be used. Particularly, carbonaceous materials, such as graphite, carbon fiber or activated carbon are preferred.

There is no particular limitation in the current collector, as long as the collector is formed of a highly conductive metal, allows easy attachment of slurry of an electrode active material thereto, and has no reactivity in the drive voltage range of the battery. Non-limiting examples of a cathode collector include foil formed of aluminum, nickel or a combination thereof. Non-limiting examples of an anode collector include foil formed of copper, gold, nickel, copper alloys or a combination thereof.

Particular examples of the binder that may be used in the present invention include polytetrafluoroethylene (PTFE), polyvinylidene fluoride (PVdF), or the like.

There is no particular limitation in the conductive agent, as long as the conductive agent is an electroconductive material that does not cause a chemical change in the electrochemical device. In general, carbon black, graphite, carbon fibers, carbon nanotubes, metal powder, conductive metal oxide, organic conductive agents may be used. Commercially available conductive agents include acetylene black-based conductive agents (available from Chevron Chemical Company or Gulf Oil Company), Ketjen Black EC series (available from Armak Company), Vulcan XC-72 (available from Cabot Company) and Super P (available from MMM Co.).

As the solvent for forming the slurry, organic solvents, such as NMP (N-methyl pyrrolidone), DMF (dimethyl formamide), acetone or dimethyl acetamide, water, etc. may be used. Such solvents may be used alone or in combination. The solvent is used in an amount sufficient for dissolving and dispersing the electrode active material, the binder and the conductive agent therein, considering the coating thickness of the slurry and the productivity.

Although there is no particular limitation in the separator that may be used in the present invention, a porous separator is preferred, and particular examples thereof include polypropylene-based, polyethylene-based, and polyolefin-based porous separators.

Further, although there is no particular limitation in the outer shape of the electrochemical device according to the present invention, the electrochemical device may have a cylindrical shape using a can, a prismatic shape, a pouch-like shape or a coin-like shape.

Reference will now be made in detail to the preferred embodiments of the present invention. It is to be understood that the following examples are illustrative only and the present invention is not limited thereto.

EXAMPLE 1

First, 1M $LiPF_6$ was dissolved into an organic solvent containing ethylene carbonate (EC) and ethyl methyl carbonate (EMC) in a ratio of 3:7 (v:v, EC:EMC) to provide a solution. Next, 0.5 wt % of ditrimethylolpropane tetraacrylate represented by the following Formula 5 and 3.0 wt % of propane sultone were added to the solution as additives to provide a non-aqueous electrolyte.

[Formula 5]

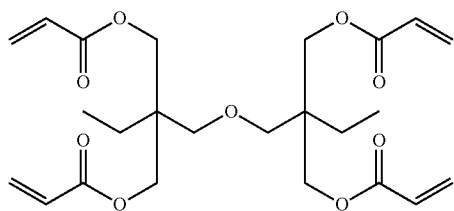

$LiCoO_2$ was used as a cathode active material, and artificial graphite was used as an anode active material. A bicell type pouch battery was provided by using the cathode active material, the anode active material and the electrolyte obtained as described above.

EXAMPLE 2

An electrolyte and a battery were provided in the same manner as described in Example 1, except that ethylene sulfite was added instead of propane sultone.

EXAMPLE 3

An electrolyte and a battery were provided in the same manner as described in Example 1, except that dipentaerythritol hexaacrylate represented by the following Formula 6 was added instead of ditrimethylolpropane tetraacrylate represented by the above Formula 5.

[Formula 6]

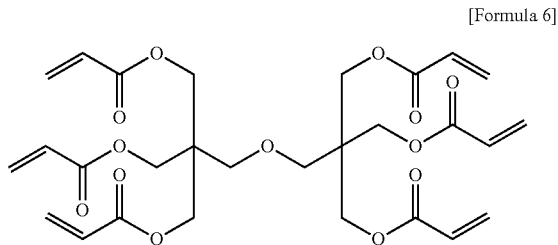 [SMILES: C=CC(=O)OCC(COCC(COC(=O)C=C)(COC(=O)C=C)COC(=O)C=C)(COC(=O)C=C)COC(=O)C=C]

EXAMPLE 4

An electrolyte and a battery were provided in the same manner as described in Example 1, except that propenyl methanesulfonate was added instead of propane sultone.

COMPARATIVE EXAMPLE 1

An electrolyte and a battery were provided in the same manner as described in Example 1, except that propane sultone was not added.

COMPARATIVE EXAMPLE 2

An electrolyte and a battery were provided in the same manner as described in Example 3, except that propane sultone was not added.

COMPARATIVE EXAMPLE 3

An electrolyte and a battery were provided in the same manner as described in Example 1, except that ditrimethylolpropane tetraacrylate (Formula 5) was not added.

COMPARATIVE EXAMPLE 4

An electrolyte and a battery were provided in the same manner as described in Example 2, except that ditrimethylolpropane tetraacrylate (Formula 5) was not added.

COMPARATIVE EXAMPLE 5

An electrolyte and a battery were provided in the same manner as described in Example 4, except that ditrimethylolpropane tetraacrylate (Formula 5) was not added.

COMPARATIVE EXAMPLE 6

An electrolyte and a battery were provided in the same manner as described in Example 1, except that ditrimethylolpropane tetraacrylate (Formula 5) and propane sultone were not added.

EXPERIMENTAL EXAMPLE 1

Test for Lifespan Characteristics

The pouch batteries according to Examples 1~4 and Comparative Examples 1~6 were subjected to 200 charge/discharge cycles under 0.5 C. Each battery was measured for the capacity maintenance (%) based on the initial capacity. The following Table 1 shows the results.

EXPERIMENTAL EXAMPLE 2

Test for Measuring Change in Thickness Under High-Temperature Storage Conditions The batteries according to Examples 1~4 and Comparative Examples 1~6 were heated from room temperature to 90° C., and then stored at 90° C. for 4 hours. Next, real-time measurement for a change in the thickness of each battery was performed while cooling the battery from 90° C. for 1 hour. The results are shown in the following Table 1.

TABLE 1

| | Additives | Capacity maintenance after 200 charge/discharge cycles (%) | Increment in thickness under high-temperature (mm) |
|---|---|---|---|
| Ex. 1 | Ditrimethylolpropane tetraacrylate 0.5 wt % Propane sultone 3 wt % | 87.1 | 0.45 |
| Ex. 2 | Ditrimethylolpropane tetraacrylate 0.5 wt % Ethylene sulfite 3 wt % | 85.3 | 0.62 |
| Ex. 3 | Dipentaerythritol hexaacrylate 0.5 wt % Propane sultone 3 wt % | 88.5 | 0.51 |
| Ex. 4 | Ditrimethylolpropane tetraacrylate 0.5 wt % Propenyl methansulfonate 3 wt % | 82.8 | 0.68 |
| Comp. Ex. 1 | Ditrimethylolpropane tetraacrylate 0.5 wt % | 65.4 | 2.1 |
| Comp. Ex. 2 | Dipentaerythritol hexaacrylate 0.5 wt % | 67.7 | 2.4 |
| Comp. Ex. 3 | Propane sultone 3 wt % | 68.8 | 1.8 |
| Comp. Ex. 4 | Ethylene sulfite 3 wt % | 65.2 | 1.9 |
| Comp. Ex. 5 | Propenyl methansulfonate 3 wt % | 70.5 | 2.5 |
| Comp. Ex. 6 | None | 52.3 | 3.4 |

As can be seen from Table 1, the batteries using the combination of an acrylate compound with a sulfinyl group-containing compound show significantly improved lifespan characteristics, as compared to the batteries using each single compound.

Additionally, the increment in the thickness of a battery is in proportion to the amount of gas generation inside a battery. Like the results of the test for evaluating lifespan characteristics, the batteries using the combination of an acrylate compound with a sulfinyl group-containing compound show a lower increment in the thickness caused by the gas generation under high-temperature storage conditions, as compared to the batteries using each single compound.

EXPERIMENTAL EXAMPLE 3

Investigation of SEI Layer Formation on Anode Via Reaction of Additive

The electrolytes according to Examples 1~4 and Comparative Examples 1~6 were used along with artificial graphite as a cathode and lithium foil as an anode to provide coin type half cells in the conventional manner. Each of the coin type half cells was subjected to three times of charge/discharge cycles under 0.2 C at 23° C., each cell was disassembled, and then the anode was collected from each cell in a discharged state. The anode was analyzed by DSC (differential scanning calorimetry) and the peak heat emission temperature was measured. The results are shown in the following Table 2. It is generally thought that the heat emission peak is the result of the thermal degradation of the SEI film on the surface of the anode.

TABLE 2

| | Additives | Initial heat emission temperature (° C.) |
|---|---|---|
| Ex. 1 | Ditrimethylolpropane tetraacrylate 0.5 wt % Propane sultone 3 wt % | 125 |
| Ex. 2 | Ditrimethylolpropane tetraacrylate 0.5 wt % Ethylene sulfite 3 wt % | 124 |
| Ex. 3 | Dipentaerythritol hexaacrylate 0.5 wt % Propane sultone 3 wt % | 127 |
| Ex. 4 | Ditrimethylolpropane tetraacrylate 0.5 wt % Propenyl methansulfonate 3 wt % | 126 |
| Comp. Ex. 1 | Ditrimethylolpropane tetraacrylate 0.5 wt % | 123 |
| Comp. Ex. 2 | Dipentaerythritol hexaacrylate 0.5 wt % | 122 |
| Comp. Ex. 3 | Propane sultone 3 wt % | 123 |
| Comp. Ex. 4 | Ethylene sulfite 3 wt % | 119 |
| Comp. Ex. 5 | Propenyl methansulfonate 3 wt % | 120 |
| Comp. Ex. 6 | None | 112 |

After the experiment, the cells using an acrylate compound in combination with a sulfinyl group-containing compound as electrolyte additives according to Examples 1~4, and the cells using each of the above compounds alone according to Comparative Examples 1~6 showed different initial heat emission temperatures at the anodes. It can be seen from the above experimental results that the compounds used in the electrolyte according to the present invention, i.e. both the acrylate compound and the sulfinyl group-containing compound participate in the formation of the SEI layers on the anode surfaces.

INDUSTRIAL APPLICABILITY

As can be seen from the foregoing, the non-aqueous electrolyte comprising an acrylate compound in combination with a sulfinyl group-containing compound makes it possible for the acrylate compound to form an SEI layer on the anode and for the sulfinyl group-containing compound to maximize the effect provided by the acrylate compound. Therefore, the electrochemical device, such as the secondary battery, using the non-aqueous electrolyte can provide improved lifespan characteristics and thermal safety.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A non-aqueous electrolyte solution consisting of: an acrylate compound, a sulfite compound, an organic solvent, and an electrolyte salt; wherein the acrylate compound is used in an amount of 0.05 to 10 wt % in the non-aqueous electrolyte.

2. The non-aqueous electrolyte solution as claimed in claim 1, wherein the acrylate compound is selected from the group consisting of tetraethyleneglycol diacrylate, polyethyleneglycol diacrylate (molecular weight 50~20,000), bisphenol A ethoxylated diacrylate (molecular weight 100~10,000), 1,4-butanediol diacrylate, 1,6-hexanediol diacrylate, trimethylolpropane triacrylate, trimethylolpropane ethyoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, and tris[2-(acryloyloxy)ethyl]isocyanurate.

3. The non-aqueous electrolyte solution as claimed in claim 1, wherein the sulfite includes a compound represented by the following Formula 1:

[Formula 1]

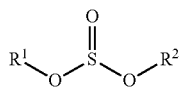

wherein each of $R^1$ and $R^2$ independently represents a hydrogen atom, halogen atom, C1~C6 alkyl group, C6~C12 aryl group, C2~C6 alkenyl group or a halogen derivative thereof, and $R^1$ and $R^2$ may be bound to each other.

4. The non-aqueous electrolyte solution as claimed in claim 1, wherein the sulfite is selected from the group consisting of ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite.

5. The non-aqueous electrolyte solution as claimed in claim 1, wherein the compound is used in an amount of 0.1~5 wt % in the non-aqueous electrolyte.

6. The non-aqueous electrolyte solution as claimed in claim 1, wherein the electrolyte salt is formed by combination of : (i) a cation selected from the group consisting of $Li^+$, $Na^+$ and $K^+$ with (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$.

7. The non-aqueous electrolyte solution as claimed in claim 1, wherein the organic solvent is at least one solvent selected from the group consisting of cyclic carbonates, linear carbonates, lactones, ethers, esters, acetonitriles, lactams, ketones and halogen derivatives thereof.

* * * * *